(12) United States Patent
Wexler et al.

(10) Patent No.: US 7,868,891 B2
(45) Date of Patent: Jan. 11, 2011

(54) LOAD BALANCING

(75) Inventors: Daniel Elliot Wexler, Soda Springs, CA (US); Larry I. Gritz, Berkeley, CA (US); Eric B. Enderton, Berkeley, CA (US); Cass W. Everitt, Round Rock, TX (US)

(73) Assignee: NVIDIA Corporation, Santa Clara, CA (US)

( * ) Notice: Subject to any disclaimer, the term of this patent is extended or adjusted under 35 U.S.C. 154(b) by 0 days.

(21) Appl. No.: 11/229,458

(22) Filed: Sep. 16, 2005

(65) Prior Publication Data

US 2006/0059494 A1    Mar. 16, 2006

Related U.S. Application Data

(60) Provisional application No. 60/610,873, filed on Sep. 16, 2004.

(51) Int. Cl.
G06F 15/16 (2006.01)
G06T 15/00 (2006.01)

(52) U.S. Cl. ................... 345/503; 345/502; 345/419

(58) Field of Classification Search ............ 345/502, 345/503, 419
See application file for complete search history.

(56) References Cited

U.S. PATENT DOCUMENTS

| 5,283,860 | A | 2/1994 | Einkauf et al. | |
|---|---|---|---|---|
| 5,594,854 | A | 1/1997 | Baldwin et al. | |
| 5,600,763 | A | 2/1997 | Greene et al. | |
| 5,701,404 | A | 12/1997 | Stevens et al. | |
| 5,808,628 | A | 9/1998 | Hinson et al. | |
| 5,850,230 | A | 12/1998 | San et al. | |
| 5,977,986 | A | 11/1999 | Coelho | |
| 6,128,642 | A | * 10/2000 | Doraswamy et al. | 709/201 |
| 6,377,265 | B1 | 4/2002 | Bong | |
| 6,426,755 | B1 | 7/2002 | Deering | |
| 6,466,227 | B1 | * 10/2002 | Pfister et al. | 345/619 |
| 6,556,200 | B1 | * 4/2003 | Pfister et al. | 345/426 |
| 6,614,445 | B1 | 9/2003 | Dorbie | |
| 6,651,082 | B1 | * 11/2003 | Kawase et al. | 718/105 |
| 6,809,739 | B2 | 10/2004 | Farinelli et al. | |
| 6,853,377 | B2 | 2/2005 | Pharr | |
| 6,862,025 | B2 | * 3/2005 | Buehler | 345/424 |
| 6,876,362 | B1 | 4/2005 | Newhall, Jr. et al. | |
| 6,919,896 | B2 | * 7/2005 | Sasaki et al. | 345/505 |
| 6,999,100 | B1 | 2/2006 | Leather et al. | |
| 7,015,914 | B1 | 3/2006 | Bastos et al. | |
| 7,061,502 | B1 | 6/2006 | Law et al. | |
| 7,071,937 | B1 | 7/2006 | Collodi | |
| 7,091,979 | B1 | 8/2006 | Donovan | |
| 7,119,810 | B2 | 10/2006 | Sumanaweera et al. | |

(Continued)

OTHER PUBLICATIONS

Wilfrid Lefer, An Efficient Parallel Ray Tracing Scheme for Distributed Memory Parallel Computers, ACM Press, Nov. 1993, pp. 77-80.*

(Continued)

*Primary Examiner*—Daniel Washburn
(74) *Attorney, Agent, or Firm*—Berkeley Law & Technology Group, LLP

(57) ABSTRACT

Embodiments of methods, apparatuses, devices, and/or systems for load balancing two processors, such as for graphics and/or video processing, for example, are described.

105 Claims, 8 Drawing Sheets

U.S. PATENT DOCUMENTS

| | | | |
|---|---|---|---|
| 7,133,041 B2 * | 11/2006 | Kaufman et al. | 345/419 |
| 7,180,523 B1 | 2/2007 | Macri et al. | |
| 7,471,291 B2 * | 12/2008 | Kaufman et al. | 345/424 |
| 2003/0043169 A1 | 3/2003 | Hunter | |
| 2003/0227457 A1 | 12/2003 | Pharr et al. | |
| 2004/0207623 A1 | 10/2004 | Isard et al. | |
| 2005/0225670 A1 | 10/2005 | Wexler | |

OTHER PUBLICATIONS

Turner Whitted, An Improved Illumination Model for Shaded Display, ACM Press, Jun. 1990, pp. 343-349.*

Amit Reisman et al., Parallel Progressive Rendering of Animation Sequences at Interactive Rates on Distributed-Memory Machines, 1997, pp. 39-47.*

Purcell et al., Ray Tracing on Programmable Graphics Hardware, © 2002, Association for Computing Machinery, Inc., pp. 703-712.*

Nathan A. Carr et al., The Ray Engine, The Eurographics Association, 2002, pp. 37-46.*

Tong-Yee Lee, C.S. Raghavendra, John B. Nicholas, "Load Balancing Strategies for Ray Tracing on Parallel Processors", IEEE Region Annual International Conference, pp. 177-181, 1994.*

International Search Report and the Written Opinion, International application No. PCT/US05/33170, dated Apr. 2007.

"Last Time", CS679-Fall 2003—Copyright University of Wisconsin, 23 pgs.

"Order-Independent Transparency Rendering System and Method", U.S. Appl. No. 09/944,988, filed Aug. 31, 2001, 35 pgs.

Carr et al., "The Ray Engine", University of Illinois, Graphics Hardware 2002, 10 pgs.

Djeu, Peter, "Graphics on a Stream Processor", Mar. 20, 2003, 53 pgs.

Haeberli et al., "The Accumulation Buffer: Hardware Support for High-Quality Rendering", Computer Graphics, vol. 24, No. 4, Aug. 1990, pp. 309-318.

Haller, Michael, "Shader Programming Cg, NVIDIA'S Shader Language", 2003, www.nvidia.com, 45 pgs.

Heckbert et al., "Beam Tracing Polygonal Objects", Computer Graphics, vol. 18, No. 3, Jul. 1984, pp. 119-127.

Kapasi et al., "Programmable Stream Processors", Computer. Org., vol. 36, No. 8, Aug. 2003 IEEE Computer Society, pp. 1-14.

Kumar et al., "Efficient Rendering of Trimmed NURBS Surfaces", Apr. 23, 1995, pp. 1-28.

Lindhold et al., "A User-Programmable Vertex Engine", NVIDIA Corporation, 2001 ACM, pp. 149-158.

Luebke, David, "Programmable Graphics Hardware", Nov. 20, 2003, 22 pgs.

Macedonia, Michael, "The GPU Enters Computing's Mainstream", 2003 IEEE, pp. 1-5.

Mammen, Abraham, "Transparency and Antialiasing Algorithms Implemented with the Virtual Pixel Maps Technique", IEEE Computer Graphics and Applications, vol. 9, Issue 4:43-55, Jul. 1989.

U.S. Appl. No. 10/817,692, filed Apr. 2004, Wexler.

Peercy et al., "Interactive Multi-Pass Programmable Shading", ACM 2000, pp. 425-432.

Pharr et al., "Rendering Complex Scenes with Memory-Coherent Ray Tracing", Computer Science Dept., Stanford University, 1997, 8 pgs.

Polyglot, "What Are These Pixel Shaders of Which You Speak", Oct. 28, 2003, Kuro5hin, www.kuro5hin.org., pp. 1-11.

Proudfoot et al., "A Real-Time Procedural Shading System for Programmable Graphics Hardware", 2001 ACM, pp. 159-170.

Purcell et al., "Ray Tracing on Programmable Graphics Hardware", Stanford University, 2002 ACM, pp. 703-712.

Rockwood et al., "Real-time Rendering of Trimmed Surfaces", Computer Graphics, vol. 23, No. 3, Jul. 1989, pp. 107-116.

Shantz et al., "Rendering Trimmed NURBS with Adaptive Forward Differencing", Computer Graphics, vol. 22, No. 4, Aug. 1988, pp. 189-198.

Shinya et al., "Principles and Applications of Pencil Tracing", Computer Graphics, vol. 21, No. 4, Jul. 1987, pp. 45-54.

Tomov, Stan, "Numerical Simulations Using Programmable GPUs", Data Analysis and Visualization, Sep. 5, 2003, Brookhaven Science Associates, 16 pgs.

Zenz, Dave, "Advances in Graphics Architectures", Dell Graphics Technologist, Sep. 2002 Dell Computer Corporation, pp. 1-6.

Office action mailed Mar. 13, 2006 in co-pending U.S. Appl. No. 10/817,692, 13 pages.

Amendment filed Jun. 22, 2006 in co-pending U.S. Appl. No. 10/817,692, 6 pages.

Office action mailed Sep. 19, 2006 in co-pending U.S. Appl. No. 10/817,692, 12 pages.

Amendment filed Jan. 19, 2007 in co-pending U.S. Appl. No. 10/817,692, 14 pages.

Office action mailed Apr. 17, 2007 in co-pending U.S. Appl. No. 10/817,692, 13 pages.

Amendment filed Jul. 17, 2007 in co-pending U.S. Appl. No. 10/817,692, 17 pages.

Final Office action mailed Oct. 12, 2007 in co-pending U.S. Appl. No. 10/817,692, 14 pages.

Amendment After Final filed Dec. 12, 2007 in co-pending U.S. Appl. No. 10/817,692, 15 pages.

Advisory action mailed Dec. 28, 2007 in co-pending U.S. Appl. No. 10/817,692, 4 pages.

Amendment and RCE filed Jan. 31, 2008 in co-pending U.S. Appl. No. 10/817,692, 15 pages.

Office action mailed Mar. 27, 2008 in co-pending U.S. Appl. No. 10/817,692, 13 pages.

Amendment filed Jun. 27, 2008 in co-pending U.S. Appl. No. 10/817,692, 17 pages.

Final Office action mailed Nov. 6, 2008 in co-pending U.S. Appl. No. 10/817,692, 15 pages.

Amendment After Final filed Feb. 5, 2009 in co-pending U.S. Appl. No. 10/817,692, 17 pages.

Office action mailed Feb. 8, 2007 in co-pending U.S. Appl. No. 10/792,497, 17 pages.

Response filed May 8, 2007 in co-pending U.S. Appl. No. 10/792,497, 22 pages.

Final Office Action mailed Jul. 27, 2007 in co-pending U.S. Appl. No. 10/792,497, 15 pages.

Amendment After Final filed Sep. 27, 2007 in co-pending U.S. Appl. No. 10/792,497, 19 pages.

Advisory Action mailed Oct. 15, 2007 in co-pending U.S. Appl. No. 10/792,497, 4 pages.

Amendment and RCE filed Oct. 29, 2007 in co-pending U.S. Appl. No. 10/792,497, 19 pages.

Office Action mailed Dec. 4, 2007 in co-pending U.S. Appl. No. 10/792,497, 19 pages.

Amendment filed Mar. 4, 2008 in co-pending U.S. Appl. No. 10/792,497, 22 pages.

Final Office Action mailed Jul. 28, 2008 in co-pending U.S. Appl. No. 10/792,497, 19 pages.

Amendment AF filed Sep. 29, 2008 in co-pending U.S. Appl. No. 10/792,497, 23 pages.

Advisory Action mailed Oct. 14, 2008 in co-pending U.S. Appl. No. 10/792,497, 3 pages.

Amendment and RCE filed Dec. 29, 2008 in co-pending U.S. Appl. No. 10/792,497, 23 pages.

Office action mailed Feb. 2, 2009 in co-pending U.S. Appl. No. 10/792,497, 17 pages.

Everitt, "Interactive Order-Independent Transparency", May 15, 2001, 12 pages.

Notice of Allowance mailed Feb. 26, 2009 in co-pending U.S. Appl. No. 10/817,692, 8 pages.

Amendment filed May 7, 2009 in co-pending U.S. Appl. No. 10/792,497, 20 pages.

Issue Fee and Comments on Statement of Reasons for Allowance filed May 21, 2009 in co-pending U.S. Appl. No. 10/817,692, 3 pages.

Issue Notification mailed Jun. 10, 2009 in co-pending U.S. Appl. No. 10/817,692, 1 page.

Final Office action mailed Aug. 18, 2009 in co-pending U.S. Appl. No. 10/792,497, 20 pages.
Notice of Reasons for Rejection mailed Aug. 19, 2009 in co-pending JP Patent Application No. 2007-532499, 38 pages.
Certificate of Patent mailed Feb. 19, 2010 in co-pending JP Patent Application No. 2007-532499, 4 pages.

Decision to Grant a Patent mailed Jan. 7, 2010 in co-pending JP Patent Application No. 2007-532499, 4 pages.
CN Office Action & Translation issued Mar. 20, 2009 in co-pending CN Application No. 200580031001.1, 17 pages.

* cited by examiner

LOAD BALANCING

This disclosure claims priority pursuant to 35 USC 119(e) from U.S. provisional patent application Ser. No. 60/610,873, filed on Sep. 16, 2004, by Dan Wexler et al., titled "LOAD BALANCING," assigned to the assignee of the presently claimed subject matter.

BACKGROUND

This disclosure is related to load balancing, such as between co-processors, for example.

Computer graphics is an extensive field in which a significant amount of hardware and software development has taken place over the last twenty years or so. See, for example, *Computer Graphics: Principles and Practice*, by Foley, Van Dam, Feiner, and Hughes, published by Addison-Wesley, 1997. Typically, in a computer platform or other similar computing device, dedicated graphics hardware is employed in order to render graphical images, such as those used in connection with computer games, for example. For such systems, dedicated graphics hardware may be limited in a number of respects that have the potential to affect the quality of the graphics, including hardware flexibility and/or its rendering capability.

In graphics, typically, a standard computing platform will include a central processing unit (CPU) and a graphical processing unit (GPU). As GPUs continue to become more complex and capability of a larger number of computing tasks, techniques for load balancing processing between the processors becomes more desirable.

SUMMARY

Embodiments of methods, apparatuses, devices, and/or systems for load balancing two processors, such as for graphics and/or video processing, for example, are described. In accordance with one embodiment, a method of load balancing between a programmable GPU and a CPU includes the following. A two-ended queue is formed of separate work units each capable of being processed at least in part by said GPU and said CPU. The GPU and CPU process the work units by having the GPU and CPU select work units from respective ends of the queue.

BRIEF DESCRIPTION OF THE DRAWINGS

Subject matter is particularly pointed out and distinctly claimed in the concluding portion of the specification. The claimed subject matter, however, both as to organization and method of operation, together with objects, features, and advantages thereof, may best be understood by reference of the following detailed description when read with the accompanying drawings in which:

DETAILED DESCRIPTION

In the following detailed description, numerous specific details are set forth to provide a thorough understanding of the claimed subject matter. However, it will be understood by those skilled in the art that the claimed subject matter may be practiced without these specific details. In other instances, well-known methods, procedures, components and/or circuits have not been described in detail so as not to obscure the claimed subject matter.

Computer graphics is an extensive field in which a significant amount of hardware and software development has taken place over the last twenty years or so. See, for example, *Computer Graphics: Principles and Practice*, by Foley, Van Dam, Feiner, and Hughes, published by Addison-Wesley, 1997. Typically, in a computer platform or other similar computing device, dedicated graphics hardware is employed in order to render graphical images, such as those used in connection with computer games, for example. For such systems, dedicated graphics hardware may be limited in a number of respects that have the potential to affect the quality of the graphics, including hardware flexibility and/or its rendering capability. However, higher quality graphics continues to be desirable as the technology and the marketplace continues to evolve. Thus, signal processing and/or other techniques to extend the capability of existing hardware in terms of the quality graphics that may be produced continues to be an area of investigation.

As previously discussed, dedicated graphics hardware may be limited in its capabilities, such as its graphics rendering capabilities and/or its flexibility. This may be due at least in part, for example, to the cost of hardware providing improved abilities relative to the demand for such hardware. Despite this, however, in recent years, the capabilities of dedicated graphics hardware provided on state-of-the-art computer platforms and/or similar computing systems have improved and continue to improve. For example, fixed function pipelines have been replaced with programmable vertex and fragment processing stages. As recently as 6 years ago, most consumer three-dimensional (3D) graphics operations were principally calculated on a CPU and the graphics card primarily displayed the result as a frame buffer. However, dedicated graphics hardware has evolving into a graphics pipeline comprising tens of millions of transistors. Today, a programmable graphics processing unit (GPU) is capable of more than simply feed-forward triangle rendering. State-of-the art graphics chips, such as the NVIDIA GeForce 4 and the ATI Radon 9000, for example, replace fixed-function vertex and fragment processing stages with programmable stages, as described in more detail hereinafter. These programmable vertex and fragment processing stages have the capability to execute programs allowing control over shading and/or texturing calculations, as described in more detail hereinafter.

Figure 1:
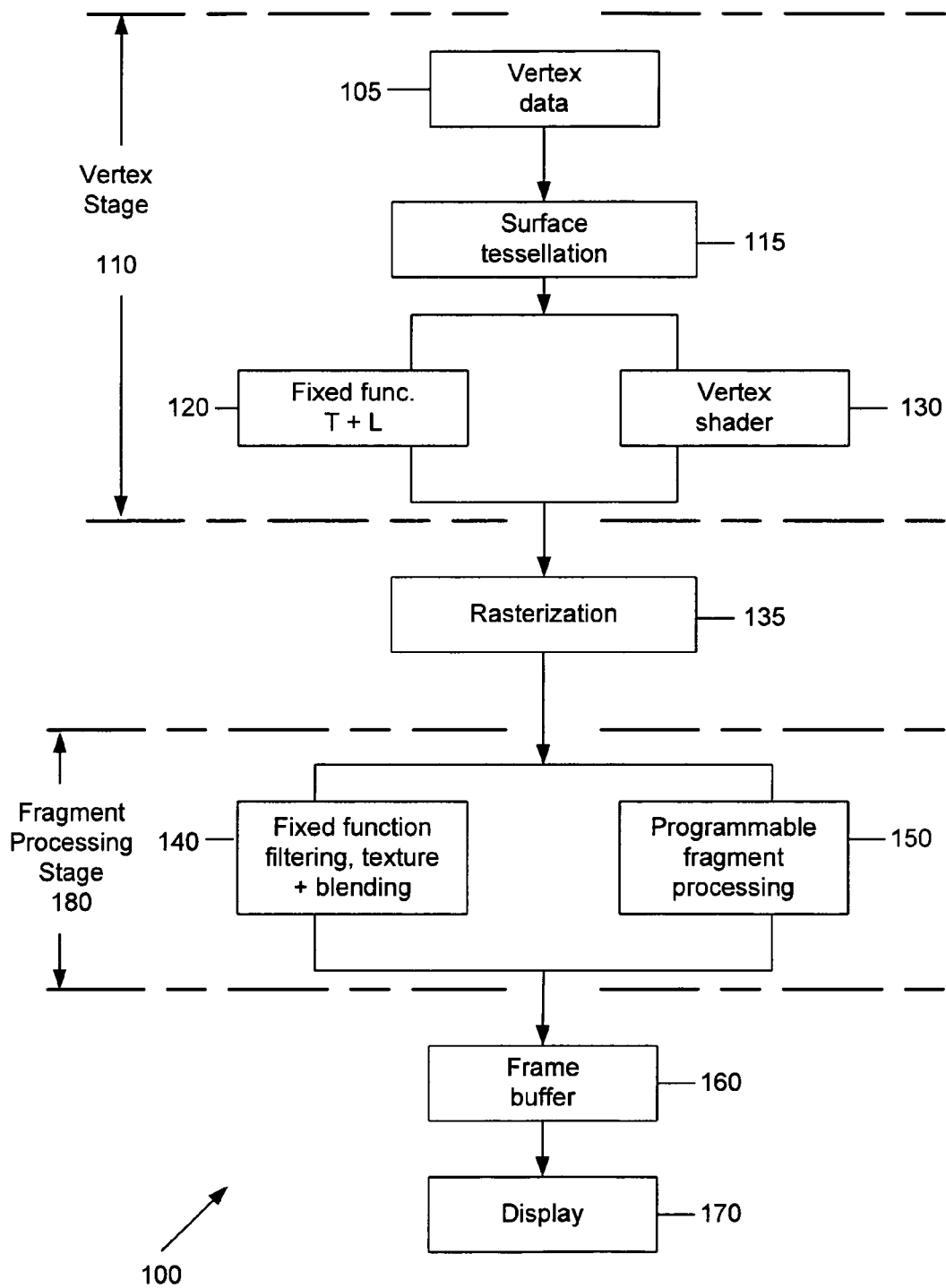
FIG. 1 is block diagram illustrating an embodiment of a typical graphics pipeline.

Similar to CPU architectures, a GPU may be broken down into pipeline stages. However, whereas a CPU embodies a general purpose design used to execute arbitrary programs, a GPU is architected to process raw geometry data and eventually represent that information as pixels on a display, such as a monitor, for example. FIG. 1 is a block diagram conceptualization of a typical graphics pipeline.

Typically, for an object to be drawn, the following operations are executed by such a pipeline:
1. An application executing on a CPU may instruct a GPU where to find vertex data, such as 105, within a portion of memory.
2. Vertex stage 110 may transform the vertex data from model space to clip space and may perform lighting calculations, etc.
3. Vertex stage 110 may generate texture coordinates from mathematical formulae.
4. Primitives, such as triangle, points, quadrangles, and the like, may be rasterized into fragments.
5. Fragment color may be determined by processing fragments through fragment processing stage 180, which may also perform, among other operations, texture memory look-ups.
6. Some tests may be performed to determine if fragments should be discarded.
7. Pixel color may be calculated based at least in part on fragment color and other operations typically involving fragments' or pixels' alpha channel.
8. Pixel information may be provided to frame buffer 160.
9. Pixels may be displayed, such as by display 170.

As illustrated by block 115 of FIG. 1, higher order surface tessellation occurs early in the geometry processing phase of a graphics pipeline. Higher-order surfaces use mathematical formulae and/or functions to represent three-dimensional (3D) surfaces. Examples include Non-uniform Rational B-splines (NURBs), Bezier curves, N-patches, and more. The data transferred is tessellated to generate more complex models. The GPU, therefore, dynamically generates or tessellates the primary model data from the application into much more detailed and complex geometry.

Figure 4:
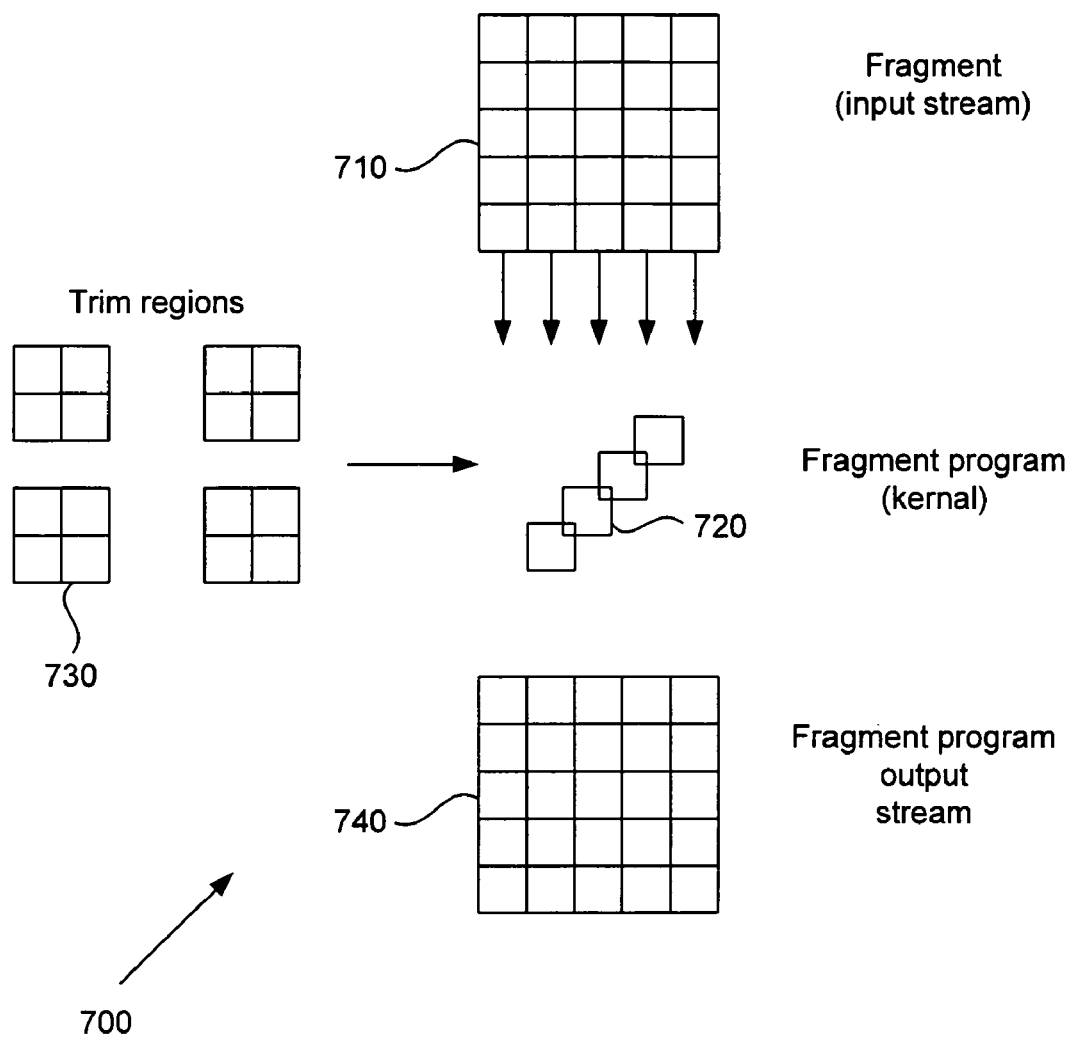
FIG. 4 is a block diagram illustrating an embodiment of a typical programmable vertex shader.

As illustrated by block 120 and previously suggested, a graphics pipeline typically will perform transform and lighting (T & L) operations and the like. Block 120 depicts a fixed-function unit; however, these operations are being replaced more and more by programmable vertex units, such as 130, also referred to as vertex shaders. Vertex shader 130 applies a vertex program to a stream of vertices. Therefore, the program processes data at the vertex level. Most operations are performed in one cycle, although this restriction need not apply. A typical vertex program is on the order of a hundred or more instructions. FIG. 4 is a block diagram illustrating an embodiment of a typical programmable vertex shader. As illustrated, vertex attributes 410 are applied to vertex program 420. The attributes are stored in registers and the program comprises a series of instructions that process the data in the registers. The resulting processed data, illustrated in FIG. 4 as vertex output data 430, is also stored in registers. Typically, while the program is executing, it will obtain program parameters, illustrated by 450 in FIG. 4, and it will utilize temporary registers, illustrated by 460 in FIG. 4.

Figure 5:
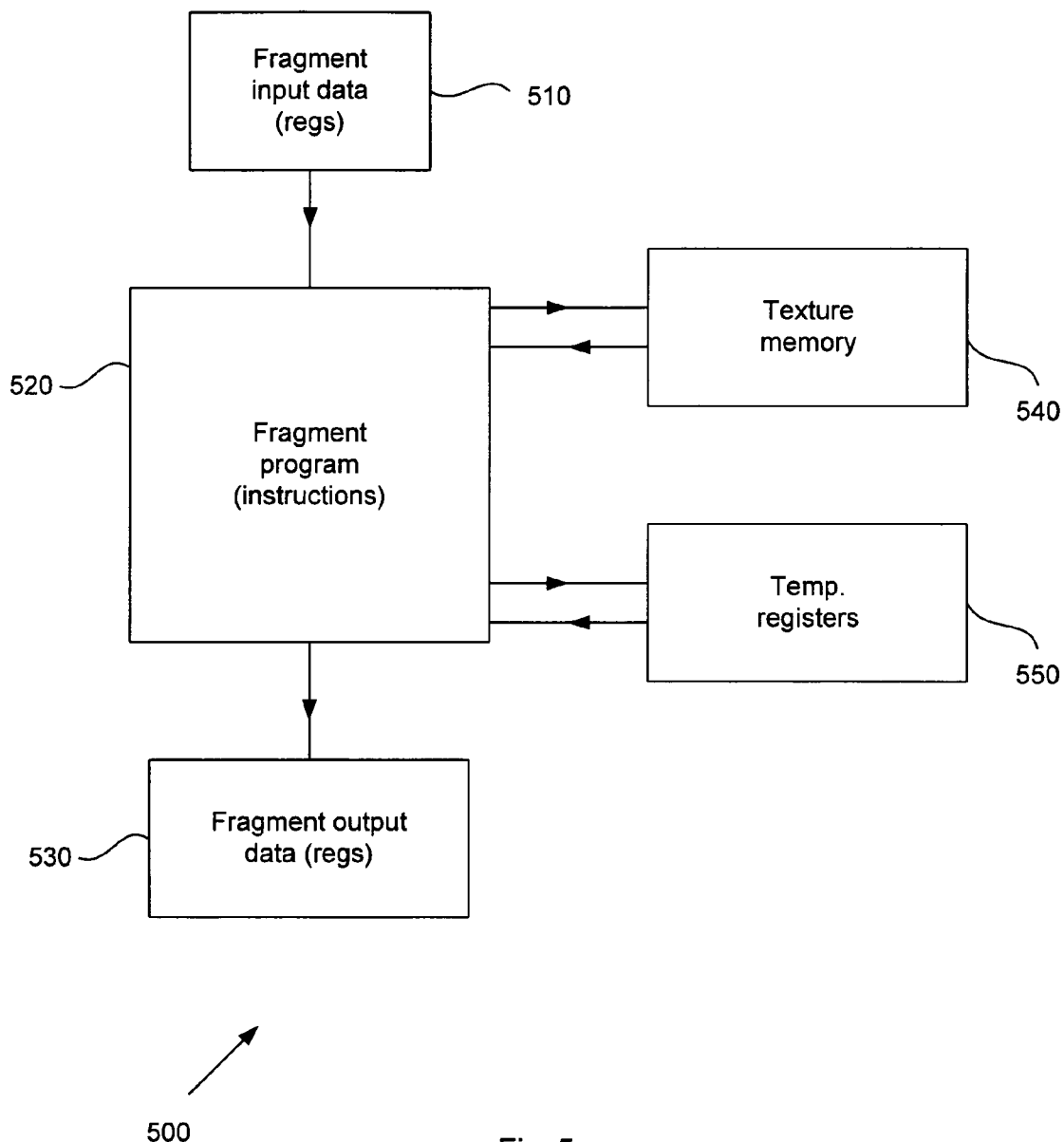
FIG. 5 is a block diagram illustrating an embodiment of a typical programmable fragment processing stage.

As with the vertex stage, the fragment processing stage has undergone an evolution from a fixed function unit, such as illustrated by block 140, to a programmable unit, such as illustrated by block 150. Thus, previously, texturing, filtering and blending were performed using fixed function state machines or similar hardware. As with vertex shaders, a pixel shader, such as 150, also referred to as a programmable fragment processing stage, permits customized programming control. Therefore, on a per pixel basis, a programmer is able to compute color and the like to produce desired customized visual effects. FIG. 5 is a block diagram illustrating an embodiment of a typical pixel shader or fragment processing stage. Similar to its counterpart in the vertex stage, embodiment 500 includes fragment input data 510, fragment program 520, and fragment output data 530. Likewise, this stage includes texture memory 540 and temporary registers 550. In this context, texture memory refers to a memory portion of the GPU included as part of a fragment processing stage, typically cache memory, where, following the execution of vertex processing and the like, particular pixel values may be loaded for additional processing, such as for filtering, shading, and/or similar processing, such as, for example, processing typically associated with creating the appearance of a visible surface of an object to be rendered.

These trends in programmability of the graphics pipeline have transformed the graphics processing unit (GPU) and its potential applications. Thus, one potential application of such a processor or processing unit is to accomplish high quality graphics processing, such as may be desirable for a variety of different situations, such as for creating animation and the like, for example. More specifically, in recent years, the performance of graphics hardware has increased more rapidly than that of central processing units (CPUs). As previously indicated, CPU designs are typically intended for high performance processing on sequential code. It is, therefore, becoming increasingly more challenging to use additional transistors to improve processing performance. In contrast, as just illustrated, programmable graphics hardware is designed for parallel processing of vertex and fragment stage code. As a result, GPUs are able to use additional transistors more effectively than CPUs to produce processing performance improvements. Thus, GPUs offer the potential to sustain processing performance improvements as semiconductor fabrication technology continues to advance.

Of course, programmability is a relatively recent innovation. Furthermore, a range of differing capabilities are included within the context of "programmability." For the discussion of this particular embodiment, focus will be placed upon the fragment processing stage of the GPU rather than the vertex stage, although, of course, the claimed subject matter is not limited in scope in this respect. Thus, in one embodiment, a programmable GPU may comprise a fragment processing stage that has a simple instruction set. Fragment program data types may primarily comprise fixed point input textures. Output frame buffer colors may typically comprise eight bits per color component. Likewise, a stage typically may have a limited number of data input elements and data output elements, a limited number of active textures, and a limited number of dependent textures. Furthermore, the number of registers and the number of instructions for a single program may be relatively short. The hardware may only permit certain instructions for computing texture addresses only at certain points within the program. The hardware may only permit a single color value to be written to the frame buffer for a given pass, and programs may not loop or execute conditional branching instructions. In this context, an embodiment of a GPU with this level of capability or a similar level of capability shall be referred to as a fixed point programmable GPU.

In contrast, more advanced dedicated graphics processors or dedicated graphics hardware may comprise more enhanced features. The fragment processing stage may be programmable with floating point instructions and/or registers, for example. Likewise, floating point texture frame buffer formats may be available. Fragment programs may be formed from a set of assembly language level instructions capable of executing a variety of manipulations. Such programs may be relatively long, such as on the order of hundreds of instructions or more. Texture lookups may be permitted within a fragment program, and there may, in some embodiments, be no limits on the number of texture fetches or the number of levels of texture dependencies within a program. The fragment program may have the capability to write directly to texture memory and/or a stencil buffer and may have the capability to write a floating point vector to the frame buffer, such as RGBA, for example. In this context, an embodiment of a GPU with this level of capability or a similar level of capability may be referred to as a floating point programmable GPU.

Likewise, a third embodiment or instantiation of dedicated graphics hardware shall be referred to here as a programmable streaming processor. A programmable streaming processor comprises a processor in which a data stream is applied to the processor and the processor executes similar computations or processing on the elements of the data stream. The system may execute, therefore, a program or kernel by applying it to the elements of the stream and by providing the processing results in an output stream. In this context, likewise, a programmable streaming processor which focuses primarily on processing streams of fragments comprises a programmable streaming fragment processor. In such a processor, a complete instruction set and larger data types may be provided. It is noted, however, that even in a streaming processor, loops and conditional branching are typically not capable of being executed without intervention originating external to the dedicated graphics hardware, such as from a CPU, for example. Again, an embodiment of a GPU with this level of capability or a similar level comprises a programmable streaming processor in this context.

Figure 2:
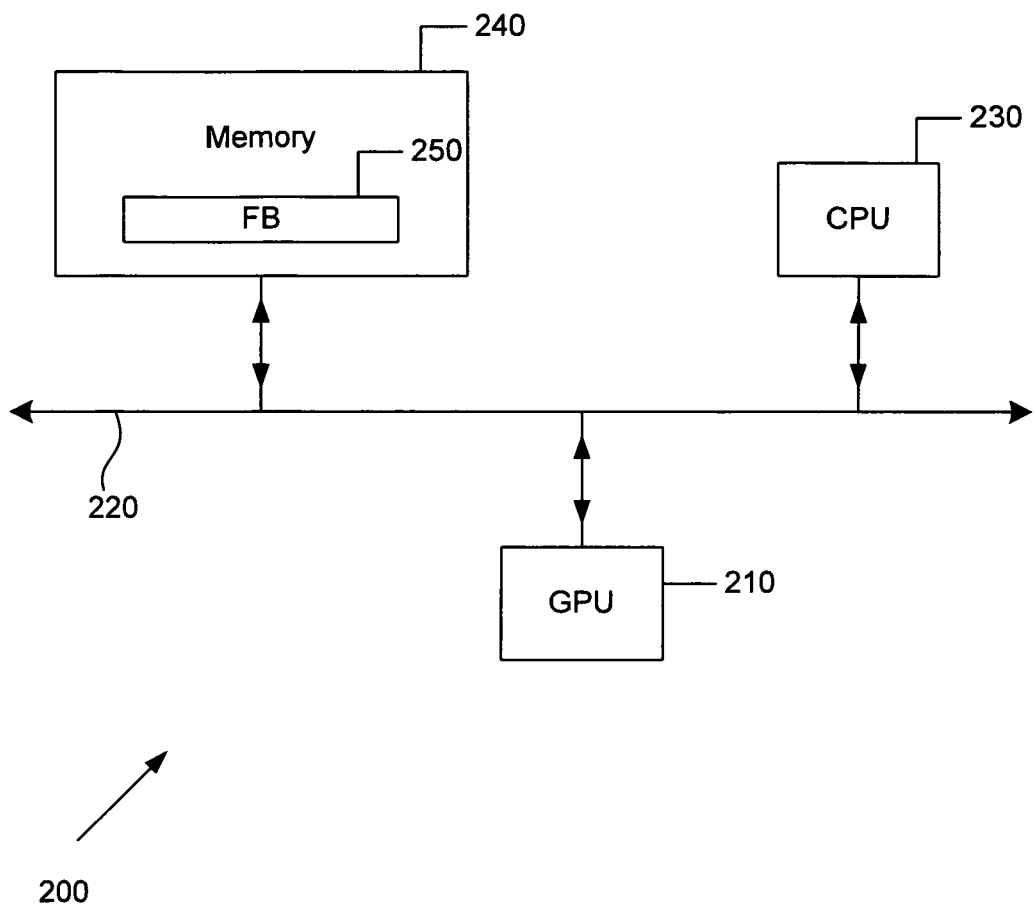
FIG. 2 is a schematic diagram of an embodiment of a computer platform that includes dedicated graphics hardware, such as a programmable GPU.

FIG. 2 is a schematic diagram illustrating an embodiment 200 comprising a system that may employ dedicated graphics hardware, such as, for example, GPU 210. It is noted that FIG. 2 is a simplified diagram for ease of discussion and illustration. Therefore, aspects such as a memory controller/arbiter, interface units to implement standard interface protocols, such as AGP and/or PCI, display devices, input devices, and the like have been omitted so as not to unnecessarily obscure the discussion.

In this particular embodiment, GPU 210 may comprise any instantiation of a programmable GPU, such as, for example, one of the three previously described embodiments, although for the purposes of this discussion, it is assumed that GPU 210 comprises a programmable floating point GPU. Likewise, it is, of course, appreciated that the claimed subject matter is not limited in scope to only the three types of GPUs previously described. These three are merely provided as illustrations of typical programmable GPUs. All other types of programmable GPUs currently known or to be developed later are included within the scope of the claimed subject matter. For example, while FIG. 2 illustrates discrete graphics hardware, alternatively, the graphics hardware may be integrated with the CPU on an IC and still remain within the scope of the claimed subject matter. Likewise, the applications of a system embodiment, such as the embodiment illustrated in FIG. 2, for example, include a host of possible applications, such as within or on: a desktop computing platform, a mobile computing platform, a handheld device, a workstation, a game console, a set-top box, a motherboard, a graphics card, and others.

Figure 8:
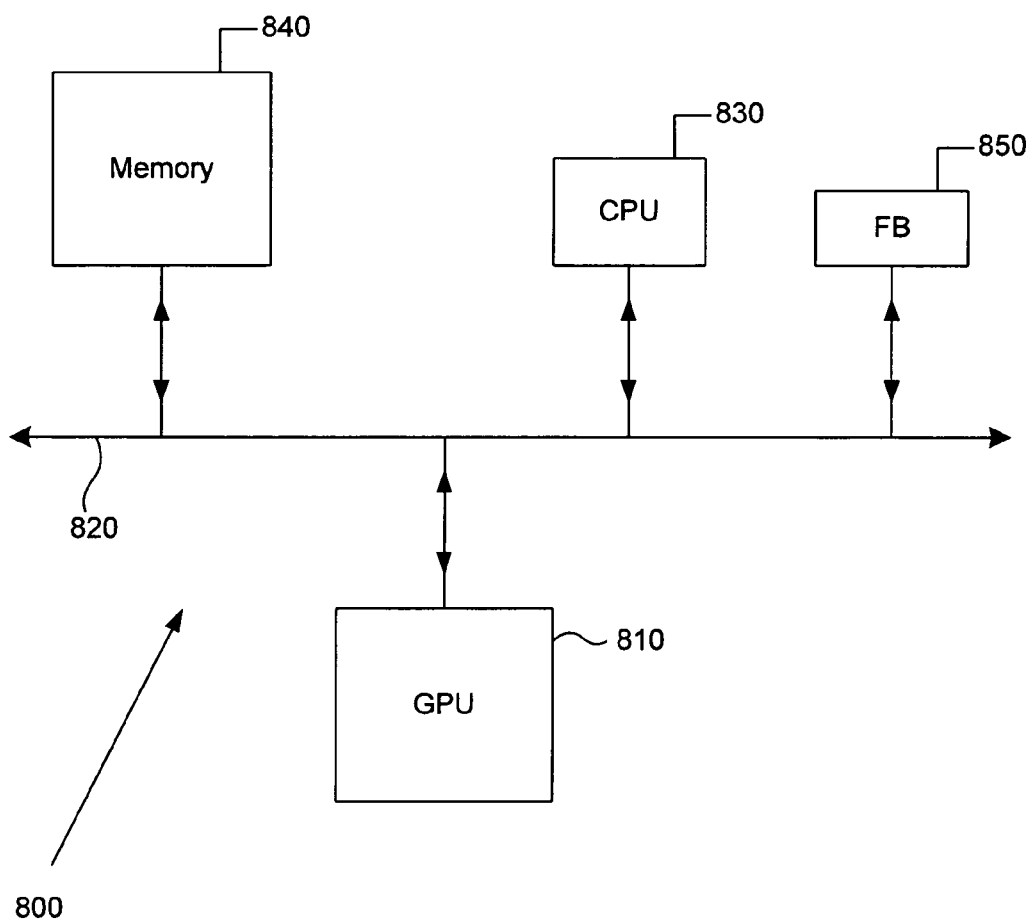
FIG. 8 is a schematic diagram illustrating another embodiment of a computer platform.

Likewise, for this simplified embodiment, system 200 comprises a CPU 230 and a GPU 210. In this particular embodiment, memory 240 comprises random access memory or RAM, although the claimed subject matter is not limited in scope in this respect. Any one of a variety of types of memory currently known or to be developed may be employed. It is noted that memory 240 includes frame buffer 250 in this particular embodiment, although, again, the claimed subject matter is not limited in scope in this respect. For example, FIG. 8 illustrates an embodiment where like reference numerals designate corresponding aspects. In embodiment 600, however, frame buffer 650 does not reside within memory 640. Communication between various system elements takes place via bus 220 in this particular embodiment, as is further illustrated in FIG. 2.

It is worth repeating that FIG. 2 is simply provided for purposes of illustration and is not intended to limit the scope of the claimed subject matter in any way. A multitude of architectures for a system that includes a GPU and a CPU is possible and the claimed subject matter is intended to encompass all such architectures. Although the claimed subject matter is not limited in scope to the embodiment illustrated in FIG. 2 just described, it is noted that this particular embodiment comprises a system employing two co-processors, CPU 230 and GPU 210. Thus, in at least this respect, this embodiment is typical of state-of-the art computing platforms. Thus, as previously described, it is desirable to have the capability to employ such a system to perform high quality graphics processing. However, it is likewise noted that the claimed subject matter is not limited to high quality graphics. For example, as will become clear, an embodiment of the claimed subject matter may prove advantageous in connection with computer games and/or other lower end applications.

In graphics, one typical and frequent computation is referred to as "ray tracing." Ray tracing is employed in a variety of ways in graphics, such as for simulating illumination effects, including shadows, reflection, and/or refraction, as well as other uses. In general, ray tracing refers to a process to determine the visibility of surfaces present in a particular graphical image by tracing imaginary rays of light from the viewer's eye to objects in the scene. See, for example, *Computer Graphics*, Sec. 15.10, pp. 701-718.

One of the difficulties with ray tracing is that typically it is one of the most time consuming graphics operations to be performed. Furthermore, ray tracing is typically performed on a CPU, rather than on a GPU due, at least in part, to the complexity of the computation involved. However, more recently, work has begun to employ a programmable GPU in the computation process. For example, in "Ray Tracing on Programmable Graphics Hardware," by Timothy Purcell et al., *ACM Transactions On Graphics*, 2002, interesting methods of storing and/or accessing data for general purpose computations on a GPU are explored. One problem with the approach suggested by Purcell et al., however, is the large amount of storage capability needed to store an entire scene while performing calculations. In another recent paper, "The Ray Engine," by Nathan Carr et al., *Graphics Hardware*, 2002, an approach is suggested in which a GPU is employed to compute ray-triangle intersections. The difficulty with this approach is that the ray-triangle intersections are computed on the GPU one triangle at a time. Such an approach, therefore, may be time consuming and may not fully utilize the parallel processing capability available via a programmable GPU. Additional techniques for using a programmable GPU to perform ray tracing for graphics processing are, therefore, desired.

Although ray tracing is a time consuming operation, it may be, at least for some computations, that more time is spent determining portions of an image where ray tracing does not need to be utilized than is spent actually performing and computing ray-primitive intersections. Thus, as will become more clear, processing advantages may be obtained by applying a programmable GPU to reduce the number of ray-primitive intersection calculations to be completed or performed by determining those portions of the image where ray tracing is not desired.

Figure 3:
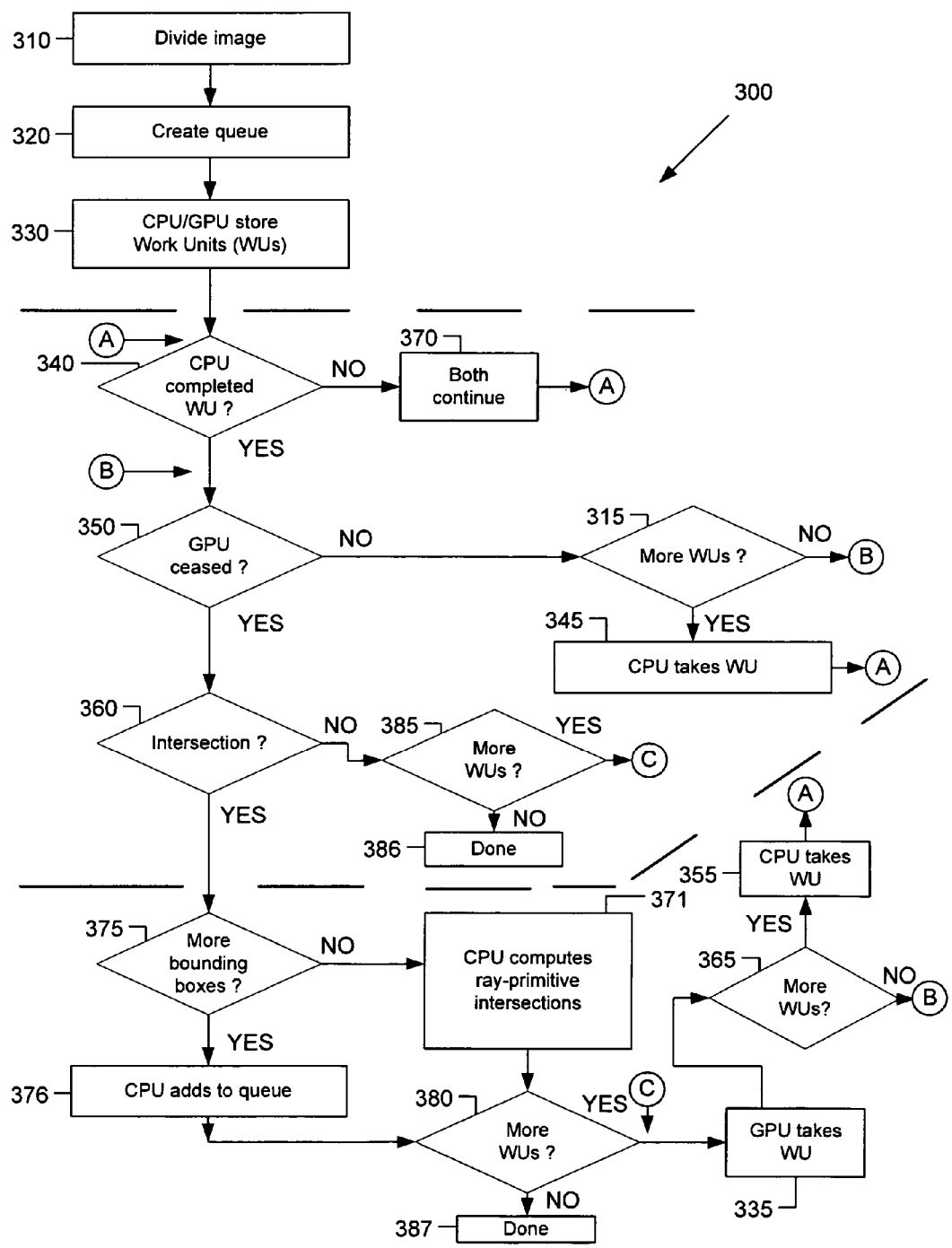
FIG. 3 is a flowchart illustrating an embodiment of a method of load balancing.

For example, FIG. 3 is a flowchart of an embodiment of a method of ray tracing by using a programmable GPU as suggested. Although this particular embodiment has a variety of implementation details, at a high-level, a programmable GPU is employed to compute intersections between a plurality of rays, referred to here as a batch, and a hierarchy of surfaces that are constructed to bound objects in the particular image. This will assist in eliminating portions of an image for ray tracing since, if the surfaces are not intersected, the primitives bounded by the surfaces will also not be intersected.

Another aspect of this particular embodiment is employing the parallel processing capability of the GPU. In particular, intersecting a plurality of rays with a hierarchy of bounding surfaces suggests a repetitive calculation that may potentially be performed effectively on a GPU. The following discussion focuses on processing by the GPU itself and how the GPU interacts with the CPU to load balance and compute ray-primitive intersections. Thus, yet another aspect of this particular embodiment involves load balancing between the GPU and the CPU.

Referring now to FIG. 3, block 310 depicts, for this particular embodiment, subdividing an image into work units to assist in performing ray tracing. As previously indicated, a programmable GPU is employed to compute intersections between a plurality of rays and a set of surfaces hierarchically bounding a set of graphical objects. Initially, however, the image is divided using non-overlapping surfaces that surround the objects. Thus, in this embodiment, the image is divided based at least in part on bounding objects, regardless of object shape, with a surface so that spatially the objects are separated. In this particular embodiment, an object comprises a mesh of quadrilateral primitives, although, of course, the claimed subject matter is not limited in scope in this respect. In this context, a primitive may comprise any polygon.

Figure 6:
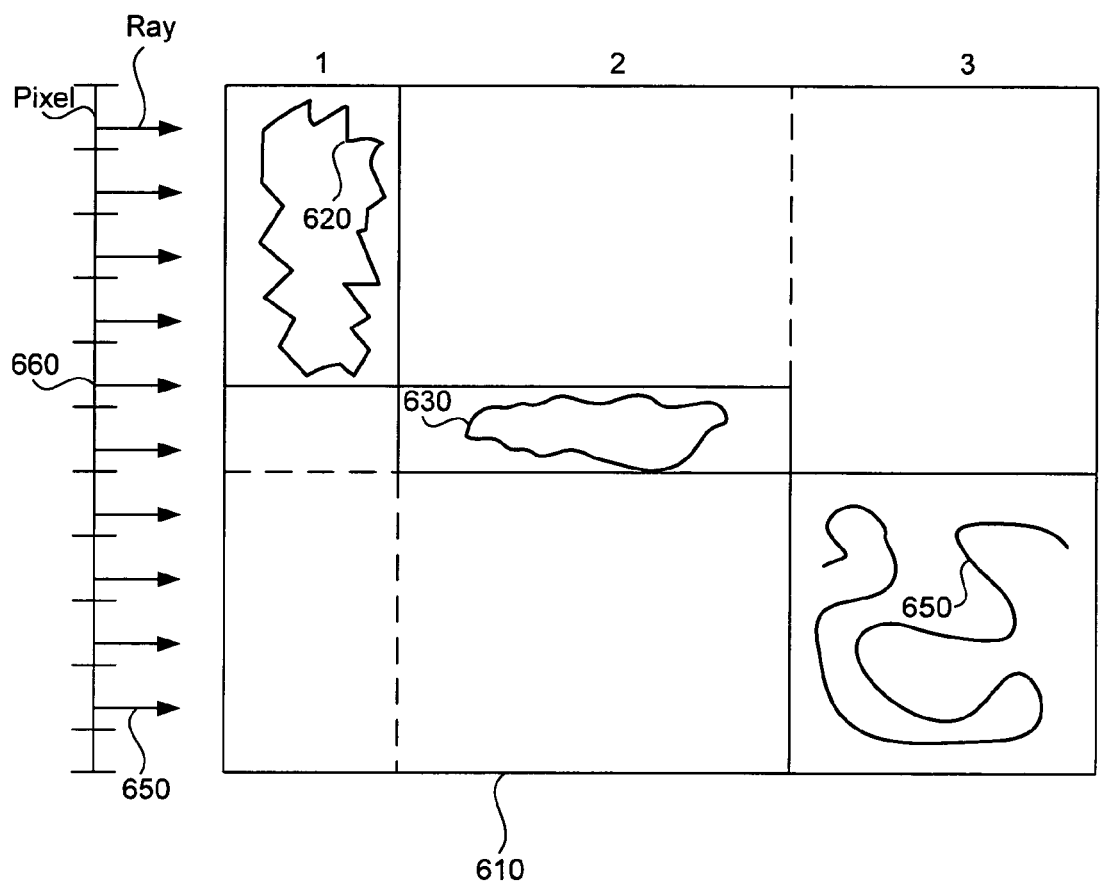
FIG. 6 is a schematic diagram illustrating an embodiment of a two-dimensional grid with boxes bounding graphical objects.

It is noted that the shape of the bounding surfaces may take any form. For example, the shape of a bounding surface may comprise a sphere, square, rectangle, convex surface, or other types of surface. For this particular embodiment, the bounding surface comprises a box, referred to here as a bounding box. One advantage of employing a box is that it is quick and easy to implement. In this context, a bounding box also shall be referred to as a voxel or volume. Due at least in part to the use of bounding boxes here, the division of the image is substantially grid-based, as illustrated in FIG. 6, for example, and discussed below. As suggested, a grid approach has advantages that include simplicity, ease of implementation, and computational speed. However, a disadvantage of this approach is that, as a method of determining ray intersections for primitives, it is relatively coarse. Here, one manner in which this is addressed is by employing a hierarchy of bounding boxes to provide greater precision, as described in more detail hereinafter.

As previously alluded to, FIG. 6 is a schematic diagram providing a simple two-dimensional representation of a grid approach, although the boxes of the grid here have different sizes. Grid 610 has objects located in boxes at row 1, column 1, row 2, column 2, and row 3 column 3. The objects, in this particular example, are denoted 620, 630 and 640, respectively. Of course, the claimed subject matter is not limited in scope to a grid approach or to this illustrative example.

In this particular embodiment, the rays are represented by pixels, as illustrated in FIG. 6. Therefore, on a programmable GPU, a quad of pixels, such as 660, may be rendered that, in effect, represent batches of rays, such as 650, pointing to grid 610, as denoted graphically in FIG. 6. Rays 650 and pixels 660 are represented in FIG. 6 from a side view. Not shown explicitly in FIG. 6, aligned along the pixels shown in a direction pointing perpendicularly to the plane of the page, are series of adjacent other pixels, which have corresponding rays as well. Although not depicted precisely to scale in FIG. 6, but as is visually apparent, the bounding boxes take up different portions or volumes as a result of surrounding different graphical objects. Of course, again, FIG. 6 is merely a simplistic two-dimensional representation of a grid provided for purposes of illustration.

As a result of dividing the image spatially, voxels may be ranked based at least in part on the number of rays that intersect the perimeter, referred to here as a batch of rays. It is noted here that, for this particular application of this particular technique, the rays are substantially coherent. Thus, based at least in part on the number of rays that intersect its perimeter, a bounding box or voxel represents, in this context, an amount of work to be performed by a processor, referred to here as an item or unit of work. The amount of work to be performed for a particular work unit or work item is related at least in part to the number of rays that intersect the perimeter of the particular bounding box. Additionally, within a bounding box is a series of additional bounding boxes or a hierarchy. Thus, the particular bounding box illustrated in FIG. 6 at row 1, column 1, for example, will be further subdivided into successive hierarchies of bounding boxes. At this stage of the process, however, as illustrated by block 320 in FIG. 3, batch size is used here to create a "two-sided" queue. In particular, to more fully exploit the parallel processing capability of the GPU, it is desirable to apply the GPU to those voxels that have a relatively large number of rays in a batch. Likewise, it is also desirable to use the CPU to process those voxels that have a relatively small batch.

As depicted at block 330 of FIG. 3, the CPU and the GPU start on separate work units from respective ends of the queue. The manner in which the work units have been formulated allows them to be processed at least in part by either the GPU or the CPU, as shall be described in more detail hereinafter. At this point, therefore, it is desirable to focus on processing by the GPU and describe load balancing between the GPU and the CPU. In this context, load balancing refers to a mechanism, either implicit or explicit, that permits the particular processors to allocate processing load among the processors so that more processing is completed than if processing load were allocated through chance occurrences or through a randomized allocation.

Once the GPU takes on a unit of work, such as, for example, the work unit designated as row 1, column 1 of grid 610, it is able to process that voxel using a technique that processes ten rays and eight bounding boxes in a cycle, although, of course, the claimed subject matter is not limited in scope in this respect. The number of rays and the bounding boxes, however, to process in a GPU cycle may vary depending upon a variety of factors. It is also noted that, in this embodiment, the same ten rays are applied. Furthermore, for this particular embodiment, the eight boxes comprise hierarchically successive boxes, although the claimed subject matter is, of course, not limited in scope to employing hierarchically successive boxes. Thus, if a particular ray intersects all eight bounding boxes, here, that provides some information to be used for further graphical processing, as described in more detail below.

The mechanism that is employed to process ten rays and eight bounding boxes in a cycle involves taking advantage of the architecture of a GPU that includes a programmable pixel shader stage, as previously described. Therefore, the number of rays, for example, to employ for processing on a GPU may vary depending, at least in part, on the application and the particular situation. It may also vary depending at least in part on other factors, such as, for example, the particular GPU, its particular architecture, the particular image being processed, etc. Likewise, a similar variation may apply to the number of bounding boxes to process in a cycle.

As previously explained, a pixel shader executes a so-called "fragment program." Thus, in the fragment stage of a GPU, such as fragment stage 180, for example, a pixel shader, such as 150, for example, is presented with a fragment program in the form of instructions to execute. Likewise, particular pixels are designated on which it is desired that the fragment program be executed. When executing such a program, a GPU typically produces or outputs values to a particular location for a particular pixel. Thus, in this embodiment, to perform a parallel computation, such as eight bounding boxes in a cycle, the results of a particular ray/pixel computation are written to a particular location, in this particular embodiment, to a stencil buffer. More specifically, for a pixel processed by a pixel shader, typically a GPU computes its color (e.g., red, green, blue), alpha (e.g., coverage), depth, and other additional values that may be specific to the particular fragment program. For this particular embodiment, the stencil buffer comprises a byte or eight bits for storing those other additional values. Hence, for this particular embodiment, eight bounding boxes, each utilizing a bit of the stencil byte, are handled in a cycle. Again, the claimed subject matter is not limited in scope in this particular respect. For example, the results of the computation might, instead, be stored as depth, as color, or as some other attribute for which the GPU has a specific buffer location. Here, as indicated, each bit in the stencil buffer represents the results of computing the intersection between a particular ray and a particular bounding box. One advantage, then, of employing the stencil buffer is that from an input/output perspective, it is relatively easy to read out a particular computation result by masking the other bits of the stencil buffer.

As previously discussed, in this particular embodiment, ten rays are processed in a cycle. In this particular embodiment, this is done in the form of a 2×5 array of pixels, although, the claimed subject matter is not limited in scope in this respect. In general, it is desirable to use an array having a dimension that is a multiple of two to make efficient use of the GPU. Of course, the claimed subject matter is not limited in scope to employing a 2×N array, where N is any positive integer. Therefore, in this particular embodiment, to capture the efficiencies of parallel processing, for this particular embodiment, ten rays are processed in a cycle.

In this particular embodiment, a bounding box is represented as a range in X, a range in Y, and a range in Z. Thus, a fragment program may be written to determine for ten pixels whether the rays associated with those pixels intersect such a bounding box. If an intersection occurs, a bit may be set in the stencil buffer for that particular pixel. Likewise, with a fragment program, computing eight bounding boxes in a cycle leverages the hardware architecture of the GPU, as previously described.

One issue when employing a GPU is determining when processing has ceased. To determine this, the CPU queries the GPU. However, such querying has some efficiency implications. Querying the GPU results in the GPU stopping its' processing so that it is able to provide data to the CPU. Thus, it may be undesirable to query too frequently because this may result in processing inefficiency. However, it is, likewise, desirable to not query the GPU too infrequently because once the GPU has ceased, it may sit idle, representing wasted processing time.

For this particular embodiment, a two sided-queue, as previously described, provides a mechanism to balance these considerations, as shall be described in more detail later. Within this context, as suggested, the frequency at which the CPU queries the GPU mechanism may affect efficiency of processing by the GPU. Thus, depending on the particular implementation or embodiment, it may be desirable to vary this frequency.

As previously described, the GPU and the CPU begin separate work units initially, as illustrated by block 330 of FIG. 3. Thus, for this embodiment, the CPU and the GPU compute intersections between a plurality of rays and a set of surfaces bounding one or more graphical objects. It is noted, however, that in this context a graphic object comprises a set of primitives. For this particular embodiment, although the claimed subject matter is not limited in scope in this respect, and as is further illustrated by block 340 of FIG. 3, whether and when the CPU has completed its' work unit is a decision point. In this context, completing a work unit refers to ceasing processing of that particular work unit and, if available, beginning processing of another work unit. If the CPU has not ceased or completed processing, then both the CPU and GPU continue processing, as illustrated by block 370. However, once the CPU has finished, it queries the GPU regarding whether the GPU has ceased processing, depicted by block 350 in FIG. 3. If the GPU has additional processing for the latest work unit it began, the GPU continues. If additional work units remain in the queue, then the CPU, which has completed, pulls another work unit from the end of the queue. Then, as before, the CPU continues until it has completed its' work unit and then, again, it queries the GPU. If, at this point, the GPU has ceased processing, then the GPU provides information back to the CPU, such as, if a "hit" or intersection has occurred. If no hits have occurred, this indicates that none of the rays have intersected bounding boxes for the voxel or work unit processed by the GPU. Thus, this work unit is complete since no rays intersect primitives. If there are additional work units, the GPU and the CPU then take additional work units and the loop continues. This is illustrated in FIG. 3 by the loop that includes blocks 385, 335, 365, and 355. It is noted, of course, as illustrated, for example, by block 386, that once there are no more work units and once the CPU and GPU have no additional processing for their respective work units, then the process has completed, for this particular embodiment.

If, alternatively, however, the GPU has uncovered a hit, this means that some rays intersected bounding boxes for the particular voxel. The GPU, by providing data back to the CPU regarding the rays where this intersection has taken place, assists the CPU to determine the number of rays that still remain "active" for further processing. This information allows the CPU to schedule another work unit in the two-sided queue previously described. This scheduling by the CPU determines whether additional processing for this particular voxel will performed by the GPU or the CPU.

At some point, however, there are no additional bounding boxes in the hierarchy. Once this occurs, assuming the GPU has uncovered a "hit," it indicates that a computation be performed to determine whether the ray or rays intersect the primitives bounded by the bounding boxes. In this particular embodiment, this latter computation is performed by the CPU rather than by the GPU. Therefore, the CPU computes intersections between one or more rays and one or more graphical objects based at least in part on the computations performed by the GPU. The CPU completes such processing for a particular work unit by determining whether the ray or rays intersect any primitives. This is illustrated in FIG. 3 by blocks 375 and 371. As depicted in FIG. 3, at block at 380, once the CPU has completed ray-primitive intersection calculations for the work unit, both the CPU and the GPU take another work unit, if available. As before this is depicted by the loop that includes blocks 335, 365 and 355.

It is possible for a ray to intersect two or three objects. In order to address this, intersections between rays and primitives are cached and sorted using a z-buffer to determine which primitive is the first or closest intersection.

It is, of course, noted that the claimed subject matter is not limited in scope to this particular embodiment, such as to a particular time at which the CPU queries the GPU, for example. As one example, the CPU may query the GPU at substantially predetermined time intervals. Alternatively, in an adaptive approach, the CPU may make queries based at least in part on the amount of processing for the GPU to do with respect to the latest work unit begun by the GPU. As noted, the manner in which the CPU queries the GPU may affect the processing efficiency of the GPU. It is intended, therefore, to include within the scope of the claimed subject matter, any and all ways in which the CPU may query the GPU. As should be clear, it is desirable to have GPU and CPU processing coincide or overlap temporally. In general, the greater amount of time that both processors are processing in parallel, the greater the throughput. Thus, it is desirable that querying of the GPU by the CPU take place in a manner to make temporal overlap of processing by the processors as extensive as possible. Of course, as previously indicated, the manner in which this is accomplished effectively may vary with particular implementations. As was also previously suggested, the GPU, therefore, in this particular embodiment, is employed to accelerate processing by assisting the CPU to determine those voxels in which it is not desirable to attempt to compute ray-primitive intersections.

Figure 7:
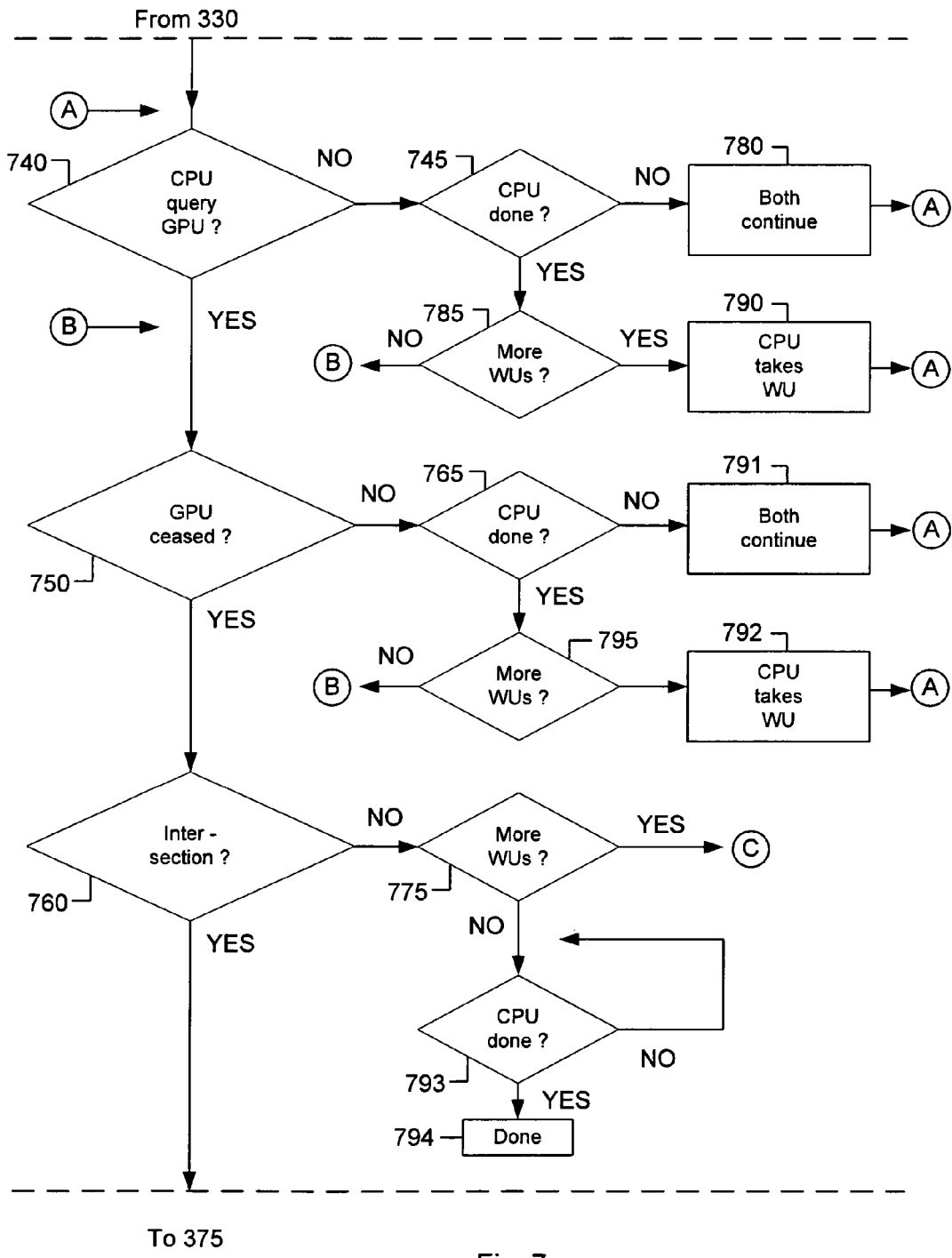
FIG. 7 is a portion of a flowchart illustrating a portion of another embodiment of a method of load balancing.

To illustrate querying of the GPU at any time, FIG. 7 is a portion of a flowchart illustrating an alternative to the method embodiment of FIG. 3. FIG. 7 may be compared directly with FIG. 3. In particular FIG. 7 fits between blocks 330 and blocks 375 of FIG. 3 and replaces blocks 340 to 360. Thus, the flowchart depicted in FIG. 7 is similar to the flowchart of FIG. 3; however, as suggested, a difference is that the GPU is not necessarily queried when the CPU has completed a work unit. This is illustrated, for example, by block 740. In particular, this decision block denotes querying of the GPU by the CPU. However, whether or not the CPU queries the GPU, a decision block at either 745 or 765, respectively, determines whether the CPU has completed processing of a work unit. If not, then, as indicated by blocks 780 and 791 respectively, the GPU and CPU continue processing. However, if, instead, the CPU has completed its' processing, illustrated at blocks 785 and 795, respective, a determination is made regarding the availability of additional work units.

In this particular embodiment, as suggested, when queried, if processing has ceased, the GPU provides information to the CPU regarding whether a bounding box has been intersected or whether the ray(s) have missed the object(s) in the particular voxel. Hitting or intersecting a bounding box suggests additional processing is desired; however, if a bounding box is not hit or intersected, then, likewise, the primitives bounded by the box will not be intersected. It is, of course, noted that the information desired is not simply that a ray has intersected a primitive, but also where that intersection has occurred, what is the closest ray-primitive intersection, etc. This is a reason to have the CPU complete the process begun by the GPU, once there are no more bounding boxes in the hierarchy. The GPU is employed, in essence, to determine when it is desirable to have the CPU compute ray-primitive intersections for a particular cell or voxel. However, advantages of employing a GPU to, at times, "walk the hierarchy" include that the GPU may perform calculations in parallel with the CPU and that the GPU may perform some calculations more efficiently than the CPU.

In summary, in this particular embodiment, a set of hierarchical voxels or bounding boxes are employed. Batches of substantially coherent rays are iterated through a bounding box hierarchy. After a voxel has completed its processing, the batch of rays is walked forward into the next set of voxels. Within this process, the number of rays contained within a voxel is employed to determine implicitly, via a two-sided queue, whether the computations would better be performed by the GPU or the CPU for the purposes of load balancing. As previously indicated, it is desirable that large batches be processed on the GPU and small batches be processed on the CPU to take advantage of the particular capabilities of these, respective processors.

It is, of course, now appreciated, based at least in part on the foregoing disclosure, that software may be produced capable of producing the desired graphics processing. It will, of course, also be understood that, although particular embodiments have just been described, the claimed subject matter is not limited in scope to a particular embodiment or implementation. For example, one embodiment may be in hardware, such as implemented to operate on a device or combination of devices as previously described, for example, whereas another embodiment may be in software. Likewise, an embodiment may be implemented in firmware, or with any combination of hardware, software, and/or firmware, for example. Likewise, although the claimed subject matter is not limited in scope in this respect, one embodiment may comprise one or more articles, such as a storage medium or storage media. This storage media, such as, one or more CD-ROMs and/or disks, for example, may have stored thereon instructions, that when executed by a system, such as a computer system, a computing platform, a GPU, a CPU, another device or system, or combinations thereof, for example, may result in an embodiment of a method in accordance with the claimed subject matter being executed, such as one of the embodiments previously described, for example. As one potential example, a computing platform may include one or more processing units or processors, one or more input/output devices, such as a display, a keyboard and/or a mouse, and/or one or more memories, such as static random access memory, dynamic random access memory, flash memory, and/or a hard drive, although, again, the claimed subject matter is not limited in scope to this example.

In the preceding description, various aspects of the claimed subject matter have been described. For purposes of explanation, specific numbers, systems and/or configurations were set forth to provide a thorough understanding of the claimed subject matter. However, it should be apparent to one skilled in the art having the benefit of this disclosure that the claimed subject matter may be practiced without the specific details. In other instances, well-known features were omitted and/or simplified so as not to obscure the claimed subject matter. While certain features have been illustrated and/or described herein, many modifications, substitutions, changes and/or equivalents will now occur to those skilled in the art. It is, therefore, to be understood that the appended claims are intended to cover all such modifications and/or changes as fall within the true spirit of the claimed subject matter.

The invention claimed is:

1. A method of load balancing between a programmable graphics processing unit (GPU) and a central processing unit (CPU) comprising:

forming a two-ended queue of separate work units each capable of being processed at least in part by said GPU and said CPU, wherein the work units individually comprise at least a portion of one or more ray tracing operations for determining whether one or more rays intersect an object, wherein the work units are individually specified at least in part by a number of intersections of a plurality of rays with one or more bounding volumes bounding the object, and wherein the two-ended queue is ordered such that a first end of the two-ended queue contains work units having bounding volumes having a larger number of ray intersections than bounding volumes for work units contained at a second end of the two-ended queue; and processing said work units by having said GPU and said CPU select work units from said respective first and second ends of said queue.

2. The method of claim 1, wherein processing includes said CPU querying said GPU.

3. The method of claim 2, wherein said CPU queries said GPU at substantially predetermined intervals.

4. The method of claim 2, wherein said CPU queries said GPU at a time based at least in part on the amount of processing for the latest work unit begun by said GPU.

5. The method of claim 2, wherein said CPU queries said GPU at varying times.

6. The method of claim 2, wherein said CPU is capable of querying said GPU at least in part in response to said CPU completing a work unit.

7. The method of claim 6, wherein said CPU begins another work unit if the result of said querying indicates said GPU has not ceased processing the latest work unit begun by said GPU.

8. The method of claim 6, wherein said GPU and CPU respectively begin another work unit if the result of said querying indicates said GPU has ceased processing the latest work unit begun by said GPU.

9. The method of claim 6, wherein said GPU begins another work unit if the result of said querying indicates said GPU completes the latest work unit begun by said GPU.

10. The method of claim 2, wherein for at least some of said work units processed by said GPU, processing is completed by said CPU.

11. The method of claim 2, wherein for at least some of said work units processed by said GPU, said CPU computes ray-primitive intersections.

12. The method of claim 1, wherein said two-ended queue is ordered based at least in part on the ability of one of said GPU and said CPU to effectively process the respective work units.

13. The method of claim 12, wherein the ability of one of said GPU and said CPU to process the respective work units is measured based at least in part on the size of a batch of rays for said particular respective work units.

14. The method of claim 1, wherein said processing performed by said GPU and said CPU coincides temporally at least in part.

15. An article comprising: a non-transitory storage medium having stored thereon instructions executable by a computing platform comprising a GPU and a CPU to:

form a two-ended queue of separate work units each capable of being processed at least in part by said GPU and said CPU, wherein the work units individually comprise at least a portion of one or more ray tracing operations for determining whether one or more rays intersect an object, wherein the work units are individually specified at least in part by a number of intersections of a plurality of rays with one or more bounding volumes bounding the object, and wherein the two-ended queue is ordered such that a first end of the two-ended queue contains work units having bounding volumes having a larger number of ray intersections than bounding volumes for work units contained at a second end of the two-ended queue; and direct the GPU and CPU to process said work units by having said GPU and said CPU select work units from said respective first and second ends of said queue.

16. The article of claim 15, wherein the storage medium has stored thereon further instructions executable by the computing platform to direct the CPU to query said GPU during said processing.

17. The article of claim 16, wherein the storage medium has stored thereon further instructions executable by the computing platform to direct the CPU to query said GPU at substantially predetermined intervals.

18. The article of claim 16, wherein the storage medium has stored thereon further instructions executable by the computing platform to direct the CPU to query said GPU at a time based at least in part on the amount of processing for the latest work unit begun by said GPU.

19. The article of claim 16, wherein the storage medium has stored thereon further instructions executable by the computing platform to direct the CPU to query said GPU at varying times.

20. The article of claim 16, wherein the storage medium has stored thereon further instructions executable by the computing platform to direct the CPU to query said GPU at least in part in response to said CPU completing a work unit.

21. The article of claim 20, wherein the storage medium has stored thereon further instructions executable by the computing platform to direct the CPU to begin another work unit if the result of said query indicates said GPU has not ceased processing the latest work unit begun by said GPU.

22. The article of claim 20, wherein the storage medium has stored thereon further instructions executable by the computing platform to direct said GPU and CPU respectively to begin another work unit if the result of said querying indicates said GPU has ceased processing the latest work unit begun by said GPU.

23. The article of claim 20, wherein the storage medium has stored thereon further instructions executable by the computing platform to direct said GPU to begin another work unit if the result of said query indicates said GPU has completed the latest work unit begun by said GPU.

24. The article of claim 16, wherein the storage medium has stored thereon further instructions executable by the computing platform to direct the CPU to complete processing for at least some of said work units processed by said GPU.

25. The article of claim 16, wherein the storage medium has stored thereon further instructions executable by the computing platform to direct the CPU to compute ray-primitive intersections for at least some of said work units processed by said GPU.

26. The article of claim 15, wherein the storage medium has stored thereon further instructions executable by the computing platform to order said two-ended queue based at least in part on the ability of one of said GPU and said CPU to effectively process the respective work units.

27. The article of claim 26, wherein the storage medium has stored thereon further instructions executable by the computing platform to measure the ability of one of said GPU and said CPU to process the respective work units based at least in part on the size of a batch of rays for said particular respective work units.

28. The article of claim 15, wherein the storage medium has stored thereon further instructions executable by the computing platform to direct the CPU to perform said processing performed by said CPU coincident with said processing performed by said GPU at least in part.

29. An apparatus comprising:
a CPU and a programmable GPU, said CPU and/or GPU to generate a two-ended queue of separate work units each capable of being processed at least in part by said GPU and said CPU, wherein the work units individually comprise at least a portion of one or more ray tracing operations for determining whether one or more rays intersect an object, wherein the work units are individually specified at least in part by a number of intersections of a plurality of rays with one or more bounding volumes bounding the object, and wherein the two-ended queue is ordered such that a first end of the two-ended queue contains work units having bounding volumes having a larger number of ray intersections than bounding volumes for work units contained at a second end of the two-ended queue;
said GPU and said CPU further to process said work units at least in part by selecting work units from said respective first and second ends of said queue.

30. The apparatus of claim 29, said CPU further to query said GPU.

31. The apparatus of claim 30, said CPU to query said GPU at substantially predetermined intervals.

32. The apparatus of claim 30, said CPU to query said GPU at a time based at least in part on the amount of processing for the latest work unit begun by said GPU.

33. The apparatus of claim 30, said CPU to query said GPU at varying times.

34. The apparatus of claim 30, said CPU to query said GPU at least in part in response to said CPU completing a work unit.

35. The apparatus of claim 34, said CPU to begin another work unit if the result of said querying indicates said GPU has not ceased processing the latest work unit begun by said GPU.

36. The apparatus of claim 34, said GPU and CPU respectively to begin another work unit if the result of said querying indicates said GPU has ceased processing the latest work unit begun by said GPU.

37. The apparatus of claim 34, said GPU to begin another work unit if the result of said querying indicates said GPU has completed the latest work unit begun by said GPU.

38. The apparatus of claim 30, said CPU to compute ray-primitive intersections for at least some of said work units processed by said GPU.

39. The apparatus of claim 29, wherein said programmable GPU is incorporated in one or more of a desktop computer, a mobile computer, a game console, a hand-held device, a wireless communications device, a networked device, a display system, a motherboard, a graphics card, and/or an integrated circuit chip.

40. An apparatus comprising:
a first means for processing coupled to a second means for processing, said
second means for processing comprising a means for graphical processing;
said first means and said second means being adapted to form a two-ended queue of separate work units each capable of being processed at least in part by said first means and said second means, wherein the work units individually comprise at least a portion of one or more ray tracing operations for determining whether one or more rays intersect an object, wherein the work units are individually specified at least in part by a number of intersections of a plurality of rays with one or more bounding volumes bounding the object, and wherein the two-ended queue is ordered such that a first end of the two-ended queue contains work units having bounding volumes having a larger number of ray intersections than bounding volumes for work units contained at a second end of the two-ended queue;
said first and second means further to process said work units at least in part by the first means selecting said work units from said second end of said queue and by the second means selecting said work units from said first end of said queue.

41. The apparatus of claim 40, said first means further to query said second means.

42. The apparatus of claim 41, said first means to query said second means at substantially predetermined intervals.

43. The apparatus of claim 41, said first means to query said second means at a time based at least in part on the amount of processing for the latest work unit begun by said second means.

44. The apparatus of claim 41, said first means to query said second means at varying times.

45. The apparatus of claim 41, said first means to query said second means at least in part in response to said first means completing a work unit.

46. The apparatus of claim 45, said first means to begin another work unit if the result of said querying indicates said second means has not ceased processing the latest work unit begun by said second means.

47. The apparatus of claim 45, said first and second means respectively to begin another work unit if the result of said querying indicates said second means has ceased processing the latest work unit begun by said second means.

48. The apparatus of claim 45, said second means to begin another work unit if the result of said querying indicates said second means has completed the latest work unit begun by said second means.

49. The apparatus of claim 41, said first means to compute ray-primitive intersections for at least some of said work units processed by said second means.

50. The apparatus of claim 40, wherein said second means comprises a programmable GPU.

51. The apparatus of claim 50, wherein said programmable GPU is incorporated in one or more of a desktop computer, a mobile computer, a game console, a hand-held device, a wireless communications device, a networked device, a display system, a motherboard, a graphics card, and/or an integrated circuit chip.

52. A method of using a programmable GPU to reduce the number of ray-primitive intersection calculations comprising:
computing, on said programmable GPU, intersections among a plurality of rays and a set of bounding volumes bounding at least one graphical object, wherein said programmable GPU comprises a graphics pipeline including a programmable fragment processing stage to compute at least in part said intersections in parallel, said programmable GPU to provide information regarding said intersections to a CPU as part of a load balancing operation;
wherein said load balancing operation comprises forming a two-ended queue of separate work units each capable of being processed at least in part by said GPU and said CPU, wherein the work units individually comprise at least a portion of one or more ray tracing operations for determining whether one or more rays intersect an object, wherein the work units are individually specified at least in part by a number of intersections of a plurality of rays with one or more bounding volumes bounding the object, and wherein the two-ended queue is ordered such that a first end of the two-ended queue contains work units having bounding volumes having a larger number of ray intersections than bounding volumes for work units contained at a second end of the two-ended queue; and said GPU and said CPU further selecting work units from said respective first and second ends of said queue and processing said work units.

53. The method of claim 52, wherein said at least one graphical object comprises a plurality of graphical objects.

54. The method of claim 53, wherein at least some of said bounding volumes comprise convex surfaces.

55. The method of claim 54, wherein at least some of said set of bounding convex surfaces comprise a bounding box.

56. The method of claim 53, wherein said set of bounding volumes are hierarchical.

57. The method of claim 53, and further comprising:
computing, on a CPU, intersections among at least some of said plurality of rays and at least some of said plurality of graphical objects based, at least in part, on the GPU computed intersections.

58. The method of claim 57, wherein said load balancing operation comprises load balancing between the GPU computations and the CPU computations.

59. The method of claim 53, and further comprising:
computing, on said CPU, intersections among another plurality of rays and another plurality of graphical objects;
wherein said load balancing operation comprises load balancing between the GPU computations and the CPU computations.

60. The method of claim 52, wherein the parallel computing is performed by a programmable pixel shader, wherein said programmable fragment processing stage comprises said programmable pixel shader.

61. The method of claim 60, wherein said programmable pixel shader computes said intersections using a pixel array in which one of the dimensions is a multiple of two.

62. The method of claim 52, wherein the number of rays is a multiple of two.

63. The method of claim 62, wherein the number of rays is 10 and the number of bounding volumes is 8.

64. The method of claim 52, wherein said at least one graphical object comprises a set of primitives, and wherein said primitives each comprise a quadrilateral.

65. An article, comprising: a non-transitory storage medium having stored thereon instructions executable by a computing platform comprising a CPU and a programmable GPU to:
compute, on said programmable GPU, intersections among a plurality of rays and a set of bounding volumes bounding at least one graphical object, wherein said programmable GPU comprises a graphics pipeline including a programmable fragment processing stage to compute at least in part said intersections in parallel, said programmable GPU to provide information regarding said intersections to said CPU as part of a load balancing operation;
wherein said load balancing operation comprises forming a two-ended queue of separate work units each capable of being processed at least in part by said GPU and said CPU, wherein the work units individually comprise at least a portion of one or more ray tracing operations for determining whether one or more rays intersect an object, wherein the work units are individually specified at least in part by a number of intersections of a plurality of rays with one or more bounding volumes bounding the object, and wherein the two-ended queue is ordered such that a first end of the two-ended queue contains work units having bounding volumes having a larger number of ray intersections than bounding volumes for work units contained at a second end of the two-ended queue; and direct said GPU and said CPU further to select work units from said respective first and second ends of said queue and to process said work units.

66. The article of claim 65, wherein said at least one graphical object comprises a plurality of graphical objects.

67. The article of claim 66, wherein at least some of said bounding volumes comprise convex surfaces.

68. The article of claim 67, wherein at least some of said set of bounding convex surfaces comprising a bounding box.

69. The article of claim 66, wherein said set of bounding volumes comprise a hierarchical set of bounding volumes.

70. The article of claim 66, wherein the storage medium has stored thereon further instructions executable by the computing platform to:
compute, on the CPU, intersections among at least some of said plurality of rays and at least some of said plurality of graphical objects based, at least in part, on the GPU computed intersections.

71. The article of claim 70, wherein the storage medium has stored thereon further instructions executable by the computing platform to perform said load balancing operation at least in part by load balancing between the GPU computations and the CPU computations.

72. The article of claim 66, wherein the storage medium has stored thereon further instructions executable by the computing platform to:
compute, on said CPU, intersections among another plurality of rays and another plurality of graphical objects; and
perform said load balancing operation at least in part by load balancing between the GPU computations and the CPU computations.

73. The article of claim 65, wherein the parallel computing is performed by a programmable pixel shader, wherein said programmable fragment processing stage comprises said programmable pixel shader.

74. The article of claim 73, wherein the storage medium has stored thereon further instructions executable by the computing platform to compute said intersections using a pixel array in which one of the dimensions is a multiple of two.

75. The article of claim 65, wherein the number of rays comprises a multiple of two.

76. The article of claim 75, wherein the number of rays is 10 and the number of bounding surfaces is 8.

77. The article of claim 65, wherein said at least one graphical object comprises a set of primitives, and wherein said primitives each comprise a quadrilateral.

78. An apparatus comprising:
a graphics pipeline to reduce the number of ray-primitive intersection calculations for ray tracing by computing intersections among a plurality of rays and a set of bounding volumes bounding at least one graphical object wherein said graphics pipeline comprises a programmable fragment processing stage to compute at least in part said intersections in parallel, said graphics pipeline to provide information regarding said intersections to a CPU as part of a load balancing operation;

said CPU to form a two-ended queue of separate work units each capable of being processed at least in part by said graphics pipeline and said CPU, wherein the work units individually comprise at least a portion of one or more ray tracing operations for determining whether one or more rays intersect an object, wherein the work units are individually specified at least in part by a number of intersections of a plurality of rays with one or more bounding volumes bounding the object, and wherein the two-ended queue is ordered such that a first end of the two-ended queue contains work units having bounding volumes having a larger number of ray intersections than bounding volumes for work units contained at a second end of the two-ended queue;

said graphics pipeline and said CPU further to process said work units at least in part by said graphics pipeline selecting said work units from said first end of said queue and by said CPU selecting said work units from said second end of said queue.

79. The apparatus of claim 78, wherein said graphics pipeline is incorporated in a programmable GPU.

80. The apparatus of claim 79, wherein said at least one graphical object comprises a plurality of graphical objects.

81. The apparatus of claim 80, wherein at least some of said bounding volumes comprise convex surfaces.

82. The apparatus of claim 81, wherein at least some of said set of bounding convex surfaces comprise a bounding box.

83. The apparatus of claim 80, wherein said set of bounding volumes are hierarchical.

84. The apparatus of claim 80, said CPU to compute intersections among at least some of said plurality of rays and at least some of said plurality of graphical objects based, at least in part, on the GPU computed intersections.

85. The apparatus of claim 84, said CPU and GPU to load balance between GPU computations and CPU computations.

86. The apparatus of claim 80, and further comprising:
said CPU to compute intersections among another plurality of rays and another plurality of graphical objects; and
said CPU and GPU to load balance between GPU computations and CPU computations.

87. The apparatus of claim 80, wherein said programmable GPU is incorporated in one or more of a desktop computer, a mobile computer, a game console, a hand-held device, a wireless communications device, a networked device, a display system, a motherboard, a graphics card, and/or an integrated circuit chip.

88. The apparatus of claim 79, said programmable GPU to perform the parallel computing using a programmable pixel shader, wherein said programmable fragment processing stage comprises said programmable pixel shader.

89. The apparatus of claim 88, said programmable pixel shader to compute said intersection according to a fragment program using a pixel array in which one of the dimensions is a multiple of two.

90. The apparatus of claim 79, wherein the number of rays is a multiple of two.

91. The apparatus of claim 90, wherein the number of rays is 10 and the number of bounding volumes is 8.

92. An apparatus comprising:
a first means for processing coupled to a second means for processing, said second means for processing comprising a means for graphical processing including a graphics pipeline including a programmable fragment processing stage;

said second means for processing further to reduce a number of ray-primitive intersection calculations for ray tracing by computing in parallel on said programmable fragment processing stage, intersections among a plurality of rays and a set of bounding volumes bounding at least one graphical object, said second means for graphical processing to provide information regarding said intersections to said first means for processing;

said first means for processing to form a two-ended queue of separate work units each capable of being processed at least in part by said first means for processing and said second means for processing, wherein the work units individually comprise at least a portion of one or more ray tracing operations for determining whether one or more rays intersect an object, wherein the work units are individually specified at least in part by a number of intersections of a plurality of rays with one or more bounding volumes bounding the object, and wherein the two-ended queue is ordered such that a first end of the two-ended queue contains work units having bounding volumes having a larger number of ray intersections than bounding volumes for work units contained at a second end of the two-ended queue;

said second means for processing and said first means for processing further to process said work units at least in part by said second means selecting said work units from said first end of said queue and by said first means selecting said work units from said second end of said queue.

93. The apparatus of claim 92, wherein said graphical processing means is incorporated in a programmable GPU.

94. The apparatus of claim 93, wherein said first means for processing comprises:
a CPU to compute intersections among another plurality of rays and another plurality of graphical objects; and
said CPU and GPU to load balance between GPU computations and CPU computations.

95. The apparatus of claim 93, wherein the number of rays is a multiple of two.

96. The apparatus of claim 95, wherein the number of rays is 10 and the number of bounding surfaces is 8.

97. The apparatus of claim 93, wherein said programmable GPU is incorporated in one or more of a desktop computer, a mobile computer, a game console, a hand-held device, a wireless communications device, a networked device, a display system, a motherboard, a graphics card, and/or an integrated circuit chip.

98. The apparatus of claim 92, wherein said at least one graphical object comprises a plurality of graphical objects.

99. The apparatus of claim 98, wherein at least some of said set of bounding volumes comprise convex surfaces.

100. The apparatus of claim 99, wherein at least some of said set of bounding convex surfaces comprise a bounding box.

101. The apparatus of claim 98, wherein said set of bounding volumes are hierarchical.

102. The apparatus of claim 98, wherein said first means for processing comprises a CPU to compute intersections among at least some of said plurality of rays and at least some of said plurality of graphical objects based, at least in part, on the intersections computed by said graphical processing means.

103. The apparatus of claim 102, wherein said graphical processing means comprises a programmable GPU, said CPU and GPU to load balance between GPU computations and CPU computations.

104. The apparatus of claim 92, said means for graphical processing to perform the parallel computing using a programmable pixel shader, wherein said programmable fragment processing stage comprises said programmable pixel shader.

105. The apparatus of claim 104, said programmable pixel shader to compute said intersections according to a fragment program using a pixel array in which one of the dimensions is a multiple of two.

\* \* \* \* \*